United States Patent
Yoshizawa et al.

(10) Patent No.: US 8,395,747 B2
(45) Date of Patent: Mar. 12, 2013

(54) METHOD FOR REPAIRING GLASS SUBSTRATE, PROCESS FOR PRODUCING GLASS SUBSTRATE, GLASS SUBSTRATE, AND FLAT PANEL DISPLAY

(75) Inventors: Takenori Yoshizawa, Osaka (JP); Masaya Ueda, Tokyo (JP); Yoshitomo Denpo, Kisarazu (JP)

(73) Assignees: Sharp Kabushiki Kaisha, Osaka (JP); Kyoritsu Chemical & Co., Ltd., Tokyo (JP)

( * ) Notice: Subject to any disclaimer, the term of this patent is extended or adjusted under 35 U.S.C. 154(b) by 357 days.

(21) Appl. No.: 12/667,027

(22) PCT Filed: Jun. 3, 2008

(86) PCT No.: PCT/JP2008/060212
§ 371 (c)(1), (2), (4) Date: Jan. 26, 2010

(87) PCT Pub. No.: WO2009/004886
PCT Pub. Date: Jan. 8, 2009

(65) Prior Publication Data
US 2010/0182560 A1    Jul. 22, 2010

(30) Foreign Application Priority Data
Jul. 5, 2007    (JP) .................................. 2007-177130

(51) Int. Cl.
*G02F 1/1333*    (2006.01)
*H01J 9/50*    (2006.01)
(52) U.S. Cl. .......................................... 349/158; 445/2
(58) Field of Classification Search .................. 349/158, 349/192
See application file for complete search history.

(56) References Cited

U.S. PATENT DOCUMENTS

| | | |
|---|---|---|
| 6,552,771 B1 | 4/2003 | Inoue et al. |
| 2003/0002008 A1 | 1/2003 | Inoue et al. |
| 2004/0105065 A1 | 6/2004 | Jung et al. |
| 2006/0215104 A1 | 9/2006 | Jung et al. |
| 2008/0008971 A1 | 1/2008 | Shiba et al. |

FOREIGN PATENT DOCUMENTS

| | | |
|---|---|---|
| JP | 05-150205 A | 6/1993 |
| JP | 2000-235351 A | 8/2000 |
| JP | 2000-294141 A | 10/2000 |
| JP | 2001-305526 A | 10/2001 |
| JP | 2003-321628 A | 11/2003 |
| JP | 2004-177942 A | 6/2004 |
| JP | 2006-45523 A | 2/2006 |
| KR | 2000-0048197 A | 7/2000 |
| KR | 10-2004-0046794 A | 6/2004 |

*Primary Examiner* — Sarah Hahm
(74) *Attorney, Agent, or Firm* — Birch, Stewart, Kolasch & Birch, LLP

(57) ABSTRACT

A method for repairing a glass substrate is a method for repairing a glass substrate (10) having a depression (60) formed in a display region (5). Into the depression (60), plural types of starting material from which a cross-linked epoxy resin or a cross-linked (meth)acrylic resin is made are put together with a photoinitiator, and the starting materials thus put are copolymerized by light irradiation and heat treatment. In the result, the depression (60) in a surface of the glass substrate (10) is repaired by a transparent resin (65) obtained through the copolymerization of the plural types of starting material. Therefore, the glass substrate (10) can be repaired at a low temperature without performing a sintering process. Further, the transparent resin (65) has a reticular structure obtained through random copolymerization of the plural types of starting material and, as such, has its optical anisotropy suppressed, thus preventing the emergence of an unintended luminescent spot or the like on a liquid crystal display panel.

14 Claims, 9 Drawing Sheets

METHOD FOR REPAIRING GLASS SUBSTRATE, PROCESS FOR PRODUCING GLASS SUBSTRATE, GLASS SUBSTRATE, AND FLAT PANEL DISPLAY

TECHNICAL FIELD

The present invention relates to methods for repairing glass substrates and, in particular, to a method for repairing a glass substrate having a depression therein. Further, the present invention relates to a process for producing a glass substrate with use of the repairing method, a glass substrate produced by the producing method, and a flat panel display including the glass substrate.

BACKGROUND ART

In recent years, the use of liquid crystal displays as monitors in televisions and computers has been rapidly widespread. The brightness of a liquid crystal display is regulated by controlling the transmittance of light with a liquid crystal material and a polarizing film (and a retardation film). The liquid crystal material is sealed in between two glass substrates opposed to each other.

In a liquid crystal display, a glass substrate constitutes a region where an image is displayed. Therefore, a defect in the glass substrate leads directly to deterioration in display quality. Examples of the type of defect in a glass substrate include commingling of foreign bodies and generation of bubbles or blemishes. Conventionally, glass substrates produced have been inspected for such defects, and a glass substrate found to be defective has been discarded.

However, in the case of use of only defect-free glass substrates, there is a problem with a decrease in yield. In particular, as increases in screen size of liquid crystal displays have caused large-area glass substrates to be used, it has been difficult to produce large-area glass substrates completely free of defects. Therefore, the yield problem is serious.

In better cases, defects may be found immediately after production of glass substrates. However, in some cases, defects may be found in glass substrates assembled into liquid crystal display panels. In such a case, it is necessary to disassemble a liquid crystal panel whose glass substrate has been found to be defective, replace the defective glass substrate with a defect-free glass substrate, and reassemble the liquid crystal panel; that is, an onerous task is required. Therefore, there have been aspirations for the development of techniques for repairing defective glass substrates.

In face of such a problem, Patent Literature 1 discloses a technique for repairing a defect, such as a pinhole or a void, which has occurred in the front plate of a plasma display. This technique repairs the front plate by applying or filling a glass paste to or into a missing or defective site such as a pinhole or a void.

Citation List
Patent Literature 1
Japanese Patent Application Publication, Tokukai, No. 2000-294141 A (Publication Date: Oct. 20, 2000)

SUMMARY OF INVENTION

However, in the case of repair of a glass substrate with use of a glass paste, a sintering process must be carried out after application or filling of the glass paste. The sintering process is carried out at a temperature of at least 400° C. or higher and, in some cases, may be carried out at a temperature of higher than 1,000° C. Therefore, when the glass substrate is not plain glass, i.e., when the glass substrate has a transparent electrode, a color filter, and the like formed thereon, the sintering heat undesirably causes damage to surrounding members such as the transparent electrode and the color filter. Further, also when the glass substrate is found in a liquid crystal display panel to be defective, the glass substrates cannot be repaired with use of a glass paste, in view of the effect of the sintering heat on the surrounding members.

The present invention has been made in view of the foregoing problems, and it is an object of the present invention to provide a method for repairing a glass substrate without carrying out a sintering process, a process for producing a glass substrate with use of the method, a glass substrate produced with use of the process, and a flat panel display produced with use of the process.

In order to solve the foregoing problems, a method for repairing a glass substrate is a method for repairing a glass substrate that is used in a display panel of a flat panel display and that has a depression on a surface thereof, the method including a hole plugging step of causing the depression in the surface of the glass substrate to be filled with a cross-linked, thermosetting or photocurable transparent resin.

It is preferable that the transparent resin be an epoxy resin or a (meth)acrylic resin.

Therefore, it is preferable that the method for repairing a glass substrate be a method for repairing a glass substrate that is used in a display panel of a flat panel display and that has a depression in a surface thereof, the method including a hole plugging step of causing the depression in the surface of the glass substrate to be filled with a transparent resin that is at least either a cross-linked epoxy resin or a cross-linked (meth)acrylic resin.

An example of the depression is (1) a blemish formed on a surface of a glass substrate, (2) a bubble having an opening in a surface of a glass substrate, (3) a void, formed in a surface of a glass substrate having a bubble buried therein, as a result of removing a glass material extending from the surface of the glass substrate to the bubble, or (4) a void, formed in a surface of a glass substrate as a result, for example, of scraping away a foreign body contained in the glass substrate.

According to the foregoing configuration, the depression in the glass substrate is repaired by causing the depression in the surface of the glass substrate to be filled with the transparent resin. Since the depression is repaired by using a cross-linked, thermosetting or photocurable transparent resin or, more preferably, a cross-linked epoxy resin or a cross-linked (meth)acrylic resin, instead of using a glass paste, the glass substrate can be repaired at a low temperature without carrying out a sintering process.

Further, a cross-linked, thermosetting or photocurable transparent resin such as a cross-linked epoxy resin and a cross-linked (meth)acrylic resin can be easily obtained by polymerizing (curing), in the depression, liquid monomers or oligomers from which the transparent resin is made. Therefore, the depression can be suitably filled, regardless of the shape of the depression, by filling the depression with liquid monomers or oligomers from which the transparent resin is made and cross-linking and curing the liquid monomers or oligomers.

Furthermore, because the transparent resin has a cross-linked reticular structure, the transparent resin has its optical anisotropy, i.e., birefringent properties suppressed. This makes it possible to suppress the emergence of an unintended luminescent spot in a repaired site.

Further, in order to solve the foregoing problems, a process for producing a glass substrate is a process for producing a glass substrate that is used in a display panel of a flat panel display, the process including each step of the aforementioned method for repairing a glass substrate.

According to the foregoing configuration, even in the case of generation of a bubble or blemish in a glass substrate or commingling of a foreign body at the time of manufacture of the glass substrate, the defect is appropriately repaired by the repairing method. This makes it possible to produce glass substrates with high yields.

Further, in order to solve the foregoing problems, a glass substrate is a glass substrate that is used in a display panel of a flat panel display, the glass substrate having a depression in a display region on a surface that serves as a display surface when the glass substrate constitutes the display panel, the depression being caused to be filled with a cross-linked, thermosetting or photocurable transparent resin.

More preferably, in order to solve the foregoing problems, a glass substrate is a glass substrate that is used in a display panel of a flat panel display, the glass substrate having a depression in a display region on a surface that serves as a display surface when the glass substrate constitutes the display panel, the depression being caused to be filled with a transparent resin that is at least either a cross-linked epoxy resin or a cross-linked (meth)acrylic resin.

Further, in order to solve the foregoing problems, a flat panel display includes the aforementioned glass substrate.

According to each of the configurations, the depression in the display region of the glass substrate is filled with the transparent resin. Therefore, as compared with cases where the depression is not filled, a display defect can be prevented from occurring in the depression. Further, since the depression is repaired with use of the transparent resin, the glass substrate can be produced at a low temperature without carrying out a sintering process.

Furthermore, because the transparent resin has a cross-linked reticular structure, the transparent resin has its optical anisotropy, i.e., birefringent properties suppressed. This makes it possible to suppress the emergence of an unintended luminescent spot in a repaired site.

| Reference Signs List | |
|---|---|
| 1 | Display panel |
| 5 | Display region |
| 10 | Glass substrate |
| 15 | Polarizing film |
| 20 | Liquid crystal material |
| 51 | Bubble |
| 52 | Foreign body |
| 53 | Blemish |
| 60 | Depression |
| 65 | Transparent resin |

DESCRIPTION OF EMBODIMENTS

[1. Embodiment]

One embodiment of the present invention is described below with reference to FIGS. 1 through 13. The present embodiment describes a method for repairing a defective glass substrate. Glass substrates assumed in the present embodiment are glass substrates that are used in display panels of flat panel displays such as liquid crystal displays and plasma displays. Further, there are mainly three types of possible defect in glass substrates, namely (1) generation of bubbles, (2) commingling of foreign bodies, and (3) generation of blemishes.

Figure 2:
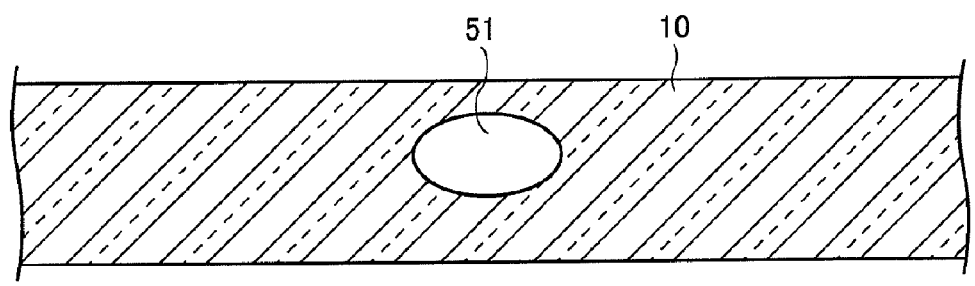
FIG. 2 is a partial cross-sectional view of a glass substrate having a bubble buried therein.
Figure 3:
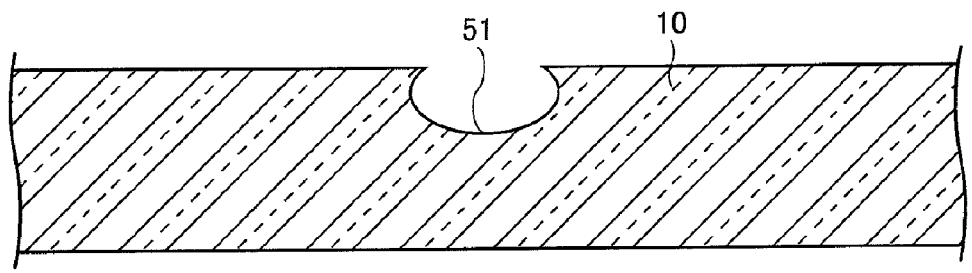
FIG. 3 is a partial cross-sectional view of a glass substrate containing a bubble having an opening in a surface of the glass substrate.

FIGS. 2 and 3 are partial cross-sectional views of glass substrates containing bubbles. In the step of melting glass raw material in producing the glass substrates 10, the bubbles 51 are formed by the generation of bubbles in the dissolved glass raw material due to air entrainment and emissions of gas from fireproof materials. Further, depending on the glass raw material used, the glass raw material may produce gas by itself. Such a bubble 51 exists with a certain probability according to the volume of glass material, and it is not easy to reduce the probability. In particular, the glass substrates 10, which are used in liquid crystal panels, have a low alkali metal content and a high melting point, and therefore are prone to produce the bubbles 51. Therefore, the method of the present embodiment for repairing a glass substrate can be said to be effective especially against the glass substrates 10, which are used in liquid crystal panels. A bubble 51 produced may be buried completely in a glass substrate 10 as illustrated in FIG. 2, or may have an opening in a surface of a glass substrate 10 as illustrated in FIG. 3.

Figure 4:
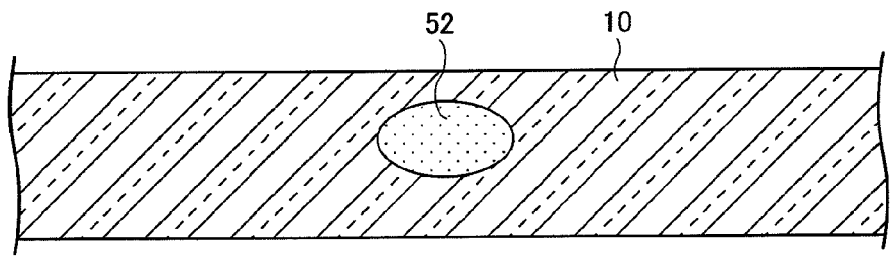
FIG. 4 is a partial cross-sectional view of a glass substrate having a foreign body buried therein.
Figure 5:
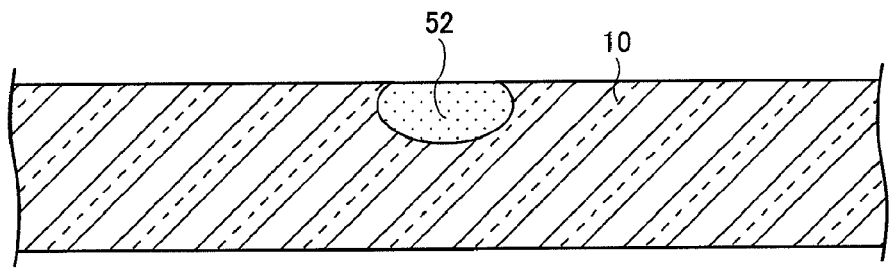
FIG. 5 is a partial cross-sectional view of a glass substrate containing a foreign body exposed on a surface thereof.

FIGS. 4 and 5 are partial cross-sectional views of glass substrates having foreign bodies commingled therein. The foreign bodies 52 are classified into that attributed to the glass raw material and that attributed to external contamination. Examples of foreign bodies 52 attributed to the glass raw material include an unmelted remnant of the glass raw material that has turned into a foreign body and a hardly soluble foreign body mixed in the glass raw material. Further, examples of external contamination include fireproof materials used in melting the glass raw material and commingled in the glass to turn into a foreign body 52. As with a bubble 51, a foreign body 52 may be buried completely in a glass substrate 10 as illustrated in FIG. 4, or may be exposed outside of a glass substrate 10 as illustrated in FIG. 5.

Figure 6:
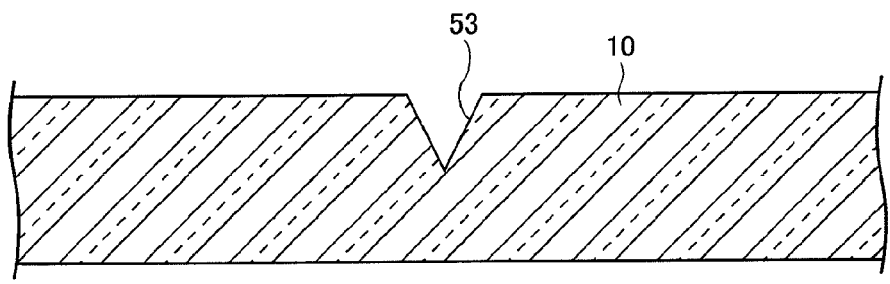
FIG. 6 is a partial cross-sectional view of a blemished glass substrate.

FIG. 6 is a partial cross-sectional view of a blemished glass substrate. In the processing step of processing the periphery of glass substrates 10 cut out from a large-sized glass plate called a primitive plate, blemishes 53 occur on surfaces of the glass substrates 10 due to contact between the glass substrates 10.

Occurrence of such defects 51 to 53 in a glass substrate 10 causes display defects such as luminescent spots, black dots, and excess brightness in the vicinity of the defects with the glass substrate 10 assembled into a display panel. Such display defects are avoided by repairing such defects 51 to 53 having occurred in the glass substrate 10.

Figure 1:
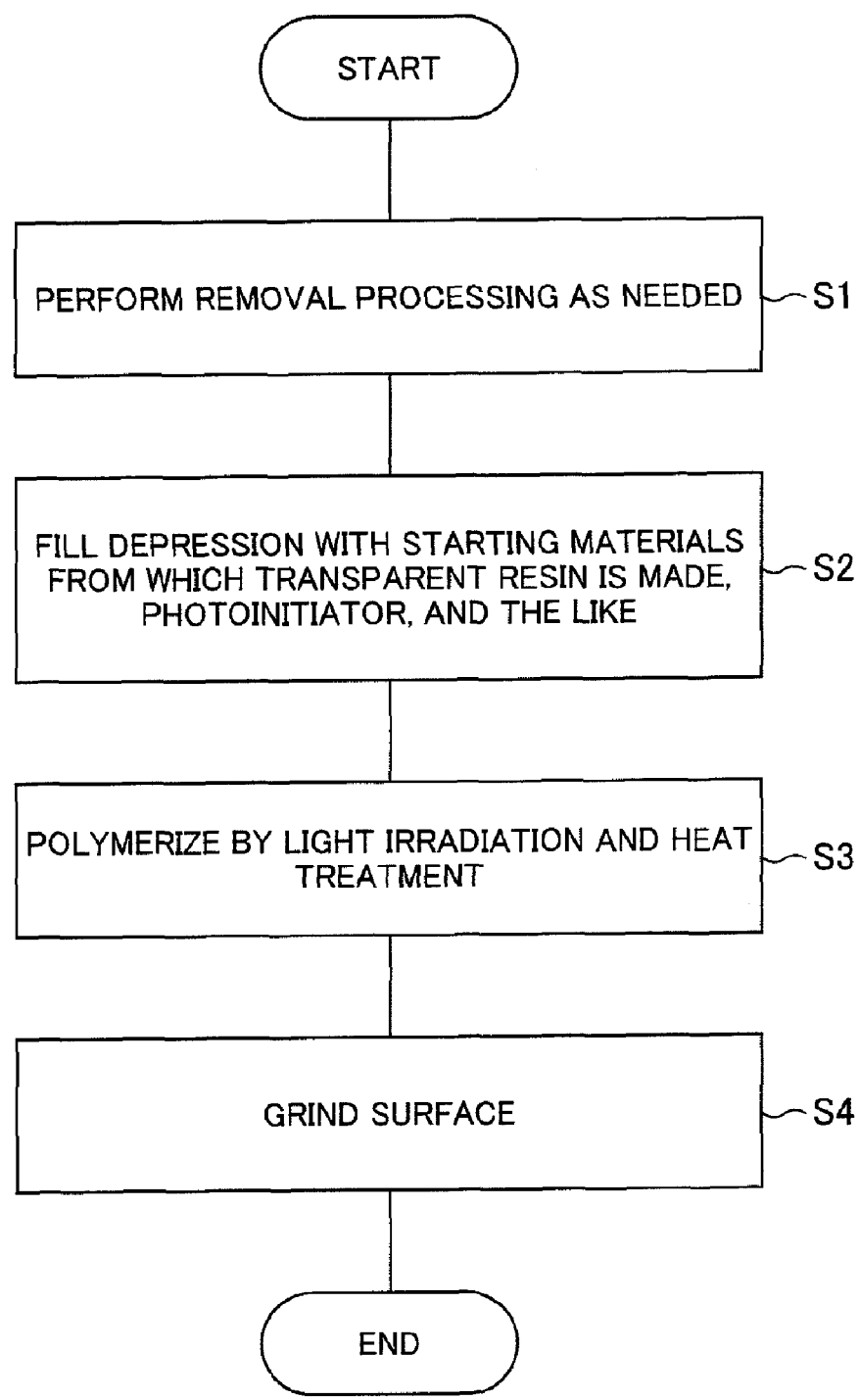
FIG. 1, showing one embodiment of the present invention, is a flow diagram showing a method for repairing a glass substrate.

FIG. 1 is a flow diagram (flow chart) showing a method of the present embodiment for repairing a glass substrate. The method of the present embodiment for repairing a glass substrate can be implemented at various stages in production of glass substrates 10 or display panels. Examples of the various stages include a stage during which a glass manufacturer cuts out glass substrates 10 from a primitive plate and ships the glass substrates 10, a stage during which a manufacturer of display devices receives glass substrates and assemble them into display panels, and a stage during which assembled display panels are inspected and assembled into display devices.

When the method of the present embodiment for repairing a glass substrate is implemented at the stage during which a glass manufacturer cuts out glass substrates 10 from a primitive plate and ships the glass substrates 10, a combination of the step of cutting out a glass substrate 10 from a primitive plate and the steps of the method of the present embodiment for repairing a glass substrate can be deemed to be a process for producing a glass substrate. The process for producing a glass substrate may further include, as a step preceding the step of cutting out a glass substrate 10 from a primitive plate, the step of preparing a primitive plate (primitive glass plate) by melting glass raw material.

Incidentally, the method of the present invention for repairing a glass substrate has the advantage of being able to directly repair a defective glass substrate 10 without disassembling a display panel into which the glass substrate 10 has been incorporated. As such, the method of the present invention for repairing a glass substrate is described below by taking, as an example, repair work at the stage where a glass substrate 10 constitutes a display panel. However, the present invention is not limited to this, and may repair a lone glass substrate 10.

Figure 7:
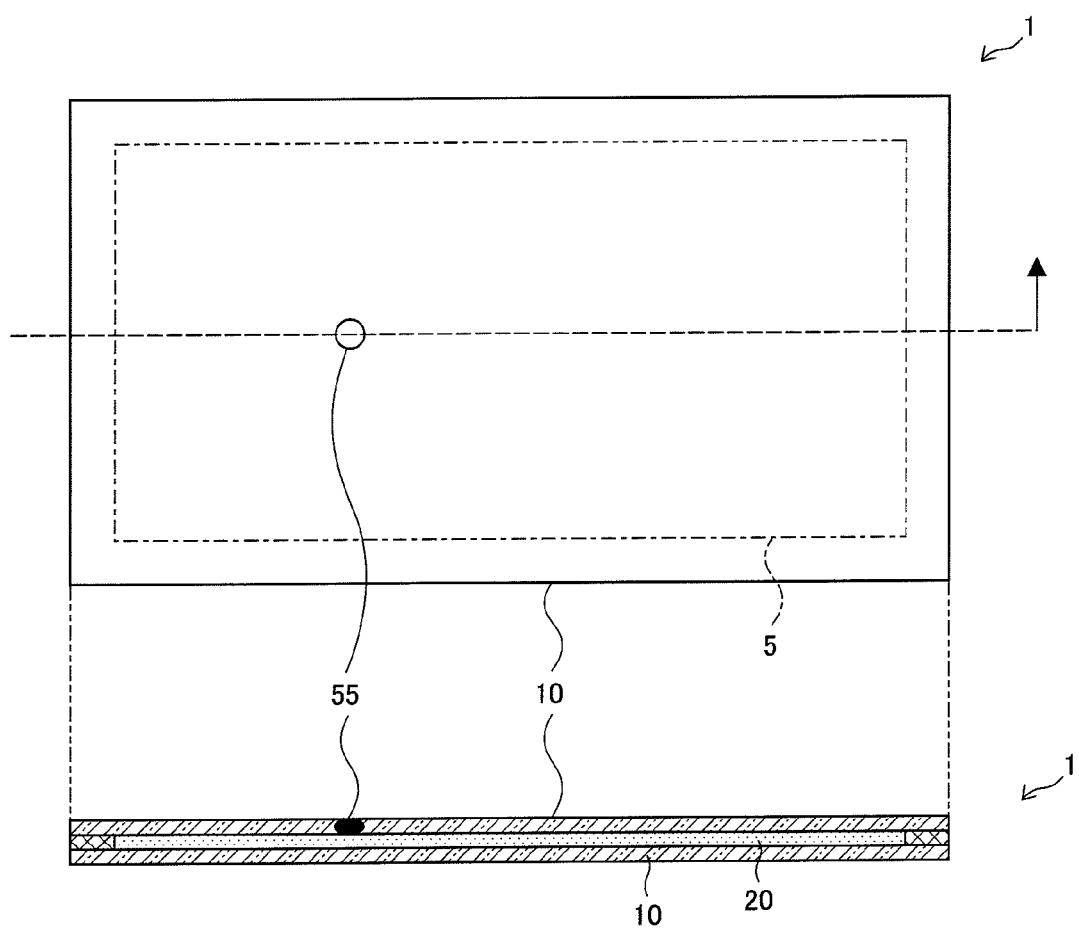
FIG. 7 illustrates the structure of a display panel including a defective glass substrate.

FIG. 7 illustrates the structure of a display panel including a defective glass substrate. It should be noted that an upper figure of FIG. 7 is a plan view of the display panel and a lower figure of FIG. 7 is a cross-sectional view of the display panel cut along a dotted line in the upper figure. The display panel 1 is a liquid crystal display panel and, as illustrated in FIG. 7, has two opposed glass substrates 10 and a liquid crystal material 20 sealed in between the glass substrates 10. Further, each of the glass substrates 10 has a polarizing film (not illustrated) provided on a surface thereof opposite the liquid crystal material 20 (such a surface being hereinafter referred to as "outer surface"). Between the polarizing film and the glass substrate 10, a retardation film may be provided as needed. Although not illustrated, either, each of the glass substrates 10 has a transparent electrode and/or a color filter formed on a surface thereof facing the liquid crystal material 20 (such a surface being hereinafter referred to as "inner surface"). Moreover, one of the glass substrates 10 has a defect 55 in a display region thereof. It is assumed, as mentioned above, that the defect 55 is a bubble 51, a foreign body 52, or a blemish 53.

When such a defect 55 is found in a glass substrate 10 of the display panel 1, the polarizing film (and the retardation film) covering the glass substrate 10 having the defect 55 is (are) removed from the glass substrate 10 so that the glass substrate 10 having the defect 55 is exposed, and then, depending on the type of defect, the glass material of which the defect 55 is made or the foreign body 52 is removed and processed as shown in the flow diagram of FIG. 1 (S1).

Figure 8:
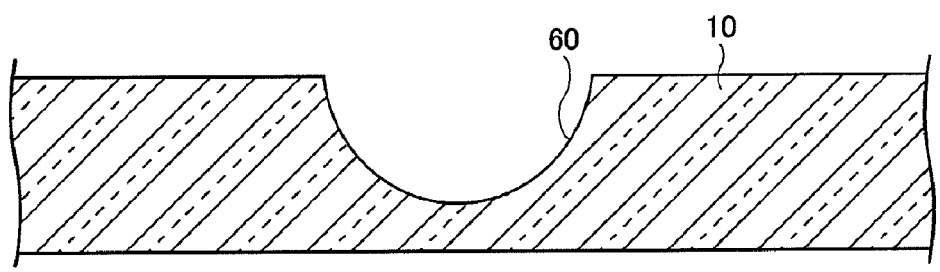
FIG. 8 is a partial cross-sectional view of a glass substrate having a depression formed therein.

For example, when the defect 55 in the glass substrate 10 is such a bubble 51 as illustrated in FIG. 2, the glass material of which the glass substrate 10 is made is removed from the outer surface of the glass substrate 10 to the bubble 51. The removal of the glass material can be carried out, for example, by grinding processing using a whetstone or lapping grinding using a tape. FIG. 8 is a partial cross-sectional view of a glass substrate finished with removal processing. As a result of removal processing, a depression 60 is formed in the outer surface of the glass substrate 10 as illustrated in FIG. 8.

Alternatively, when the defect 55 in the glass substrate 10 is such a foreign body 52 as illustrated in FIG. 4, the glass material is removed from the outer surface of the glass substrate 10 to the foreign body 52, and the foreign body 52 is further removed. The removal of the foreign body 52 can be carried out in the same manner as the removal of the glass material. Alternatively, when the foreign body 52 has a portion exposed outside of the glass substrate 10 as illustrated in FIG. 5, the foreign body 52 is removed. At this point, the shape of the depression 60 may be arranged by removing the surrounding glass material together with the foreign body 52. In the result, the depression 60 is formed in the outer surface of the glass substrate 10 as illustrated in FIG. 8.

Alternatively, when the defect 55 in the glass substrate 10 is such a bubble 51 as illustrated in FIG. 3 or such a blemish 53 as illustrated in FIG. 6, removal processing does not need to be carried out. Of course, the shape of the depression 60 may be arranged as needed by grinding the glass material around the bubble 51 or the blemish 53.

Next, the depression in the surface of the glass substrate 10 is filled with a transparent material. The transparent material used here is not a glass paste but a transparent resin. The present embodiment uses a cross-linked epoxy resin or a cross-linked (meth)acrylic resin as the transparent resin. In the present embodiment, the term "(meth)acrylic" means both "methacrylic" and "acrylic". That is, in the present embodiment, acrylic resins and methacrylic resins are referred to collectively as (meth)acrylic resins. Specific and alternative examples of cross-linked epoxy resins or cross-linked (meth)acrylic resins will be described later.

The transparent resin only needs to have transparency and be cured by at least either heat or light, and may be composed of a thermosetting resin or a photocurable resin. Among such thermosetting resins or such photocurable resins, photosensitive thermosetting resins are included, for example.

As the thermosetting resins and the photocurable resins, resins other than acrylic resins and epoxy resins can be used. However, among the thermosetting resins or the photocurable resins, acrylic resins and epoxy resins are preferred because they have excellent transparency and weather resistance and can be cured at low temperatures.

A cross-linked epoxy resin or a cross-linked (meth)acrylic resin can be easily obtained polymerization (curing) of a starting material such as a liquid monomer or prepolymer that constitutes a main chain of each resin, when needed with a mixture of a starting material (cross-linking agent) such as an acrylic cross-linking liquid monomer or prepolymer.

Therefore, the depression 60 in the glass substrate 10 can be surely filled, regardless of the shape of the depression 60, by filling the depression 60 with monomers or prepolymers from which the transparent resin is made and cross-linking and curing the monomers or prepolymers. In the following, monomers and prepolymers (including oligomers and polymers) that constitute each resin are referred to collectively as "starting materials", including a cross-linking liquid monomer or prepolymer (cross-linking agent) that is used as need as described above.

Here, as shown in FIG. 1, the display panel 1 is placed so that an opening of the depression 60 in the glass substrate 10 faces vertically upward, and the depression 60 is filled with (i) a liquid starting material from which a transparent resin is made and (ii) a photoinitiator (photopolymerization initiator) dissolved in an organic solvent (or a monomer starting material) (S2).

Then, the various materials injected into the depression 60 are irradiated with light and treated with heat, with the result that the starting materials in the depression 60 are polymerized (S3). At this point, the polymerization reaction is initiated and accelerated by light energy and heat energy, with the result that a cured transparent (which is a cross-linked epoxy resin or a cross-linked (meth)acrylic resin here) is formed. It is preferable that the light irradiation conditions (e.g., wavelength, intensity, time) and the heat treatment conditions (e.g., temperature, time) be set appropriately according to the type of transparent resin to be synthesized and the type of photoinitiator. However, it is preferable that the depression 60 not be irradiated with light at a wavelength of not more than 350 nm. This is because irradiation of the liquid crystal material 20 with light at a wavelength of less than 350 nm adversely affects the liquid crystal material 20. Therefore, it is preferable that the interior of the depression 60 be irradiated with light via a cut filter that cuts light at a wavelength of less than 350 nm. Further, in view of the adverse effect on the surrounding members, it is preferable that an upper-limit temperature at the time of heat treatment be not more than 200° C. or, more preferably, not more than 160° C.

Although the method of the present embodiment for repairing a glass substrate requires heat treatment as shown in Step S3, the temperature required for the polymerization of the transparent resin is much lower that that required for glass sintering. Accordingly, the liquid crystal material 20 or the transparent electrode and the color filter both formed on the glass substrate 10 are not adversely affected. Therefore, the method of the present embodiment for repairing a glass substrate makes it possible to directly repair the glass substrate 10 constituting the display panel 1 (more strictly, simply by removing, from the glass substrate 10, a film such as the polarizing film covering the glass substrate 10 having the defect 55, and exposing the glass substrate 10 having the defect 55). Of course, in the case of a display panel provided with (that requires) neither a polarizing film nor a retardation film, it is not necessary to remove such films from the glass substrate 10.

The polymerization reaction in Step S3 can be carried out solely by heat treatment without photopolymerization used concomitantly therewith. However, when the resin is cured solely by heat treatment, the heat treatment necessarily needs to be carried out at a certain temperature or higher. On the other hand, concomitant use of photopolymerization makes it possible to reduce the temperature of heat treatment required for polymerization and, in some cases, makes it possible to omit the heat treatment. This makes it possible to suppress the adverse effect of heat on the surrounding various members. Further, the reduction in temperature of heat treatment or the elimination of the heat treatment suppresses a change in volume of the starting materials due to thermal expansion and, as will be shown later in Examples, makes it possible to reduce the generation of bubbles in the transparent resin. This brings about the advantage of being able to obtain a high-quality glass substrate having no bubbles contained in a repaired site.

When the transparent resin filling the depression 60 is sufficiently cured after Step S3, the surface of the transparent resin is ground in such a way as to be flat and smooth (S4). At this point, it is preferable that the surface of the transparent resin be ground in such a way as to be flush with the surface of the glass substrate 10.

Figure 9:
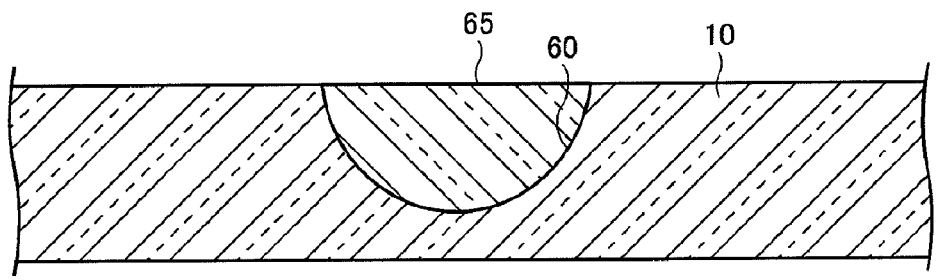
FIG. 9 is a partial cross-sectional view of a glass substrate having a depression filled with a transparent resin.

The repair of the glass substrates 10 is completed through all these steps. FIG. 9 is a partial cross-sectional view of a glass substrate whose defect has been repaired by the method of the present invention for repairing a glass substrate. As illustrated in FIG. 9, the repaired glass substrate 10 has a depression 60 in a display region 5 on the outer surface thereof, and the depression 60 has been repaired by being filled with a transparent resin 65.

Figure 10:
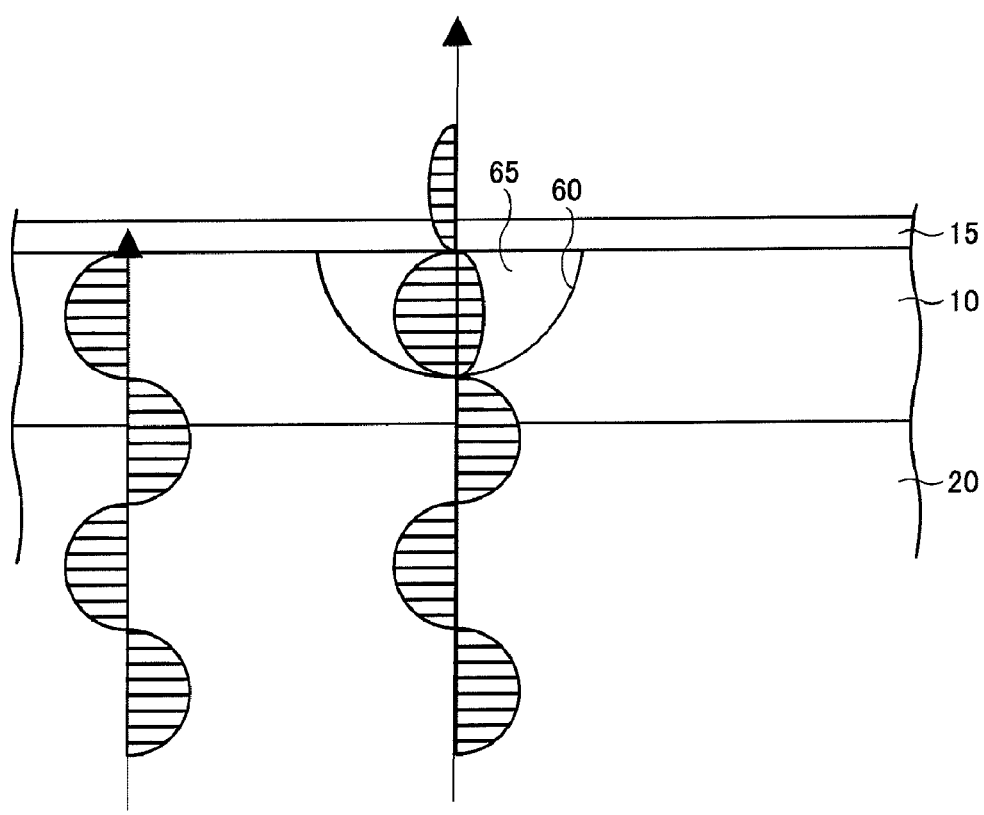
FIG. 10 schematically illustrates a mechanism by which a luminescent spot emerges in a repaired site.

The following describes specific and preferred examples of the transparent resin 65, which is used for filling the depression 60. When the glass substrate 10 is a glass substrate for use in a liquid crystal display panel, it is preferable that the transparent resin 65 have not only a high optical transparency but also a small birefringence. The reason for this is explained below. FIG. 10 is a pattern diagram illustrating the appearance of light in a case where the transparent resin 65 filling the depression 60 causes birefringence. FIG. 10 illustrates a polarizing film 15 provided in contact with the outer surface of the glass substrate 10.

When a light beam having traveled through the liquid crystal material 20 is a linearly-polarized light beam that oscillates in such directions as not to be able to travel through the polarizing film 15, the linearly-polarized light beam is blocked by the polarizing film 15, as illustrated in FIG. 10, after having traveled through the glass substrate 10. However, when the linearly-polarized light beam travels through the transparent resin 65, which is large in birefringence, the birefringent properties of the transparent resin 65 turns the linearly-polarized light beam into an elliptically-polarized light beam. Specifically, the beam light having traveled through the transparent resin 65 comes to contain oscillations in directions in which the light beam can travel through the polarizing film 15. In the result, the light beam having traveled through the transparent resin 65 is not completely blocked by the polarizing film 15, but leaks out. This undesirably causes the emergence of an unintended luminescent spot. In order for such a display defect not to emerge, the birefringent properties of the filling transparent resin 65 is important. Although FIG. 10 illustrates a type of display panel 1 in which no retardation film is used is described, the same applies to a type of display panel 1 in which a retardation film used.

It is preferable that the transparent reins 65 after curing have a size of birefringence of not less than 0 to not more than 0.0005, more preferably not less than 0 to not more than 0.0003, or especially preferably not more than 0 to less than 0.0001, as measured by a method described below in Examples. When the size of birefringence is not more than 0.0005, the transparent resin 65 filling the depression 60 does not cause a serious display defect. When the size of birefringence is not more than 0.0003, the transparent resin 65 filling the depression 60 hardly causes a display defect. When the size of birefringence is less than 0.0001, the transparent resin 65 filling the depression 60 does not cause a display defect at all.

When the transparent resin 65 is a cross-linked epoxy resin, it is preferable that the epoxy resin be a random copolymer obtained by randomly copolymerizing plural types of starting material each having a plurality of epoxy groups. This causes suppression in optical anisotropy of the resulting epoxy resin, thus reducing the size of birefringence.

Figure 11:
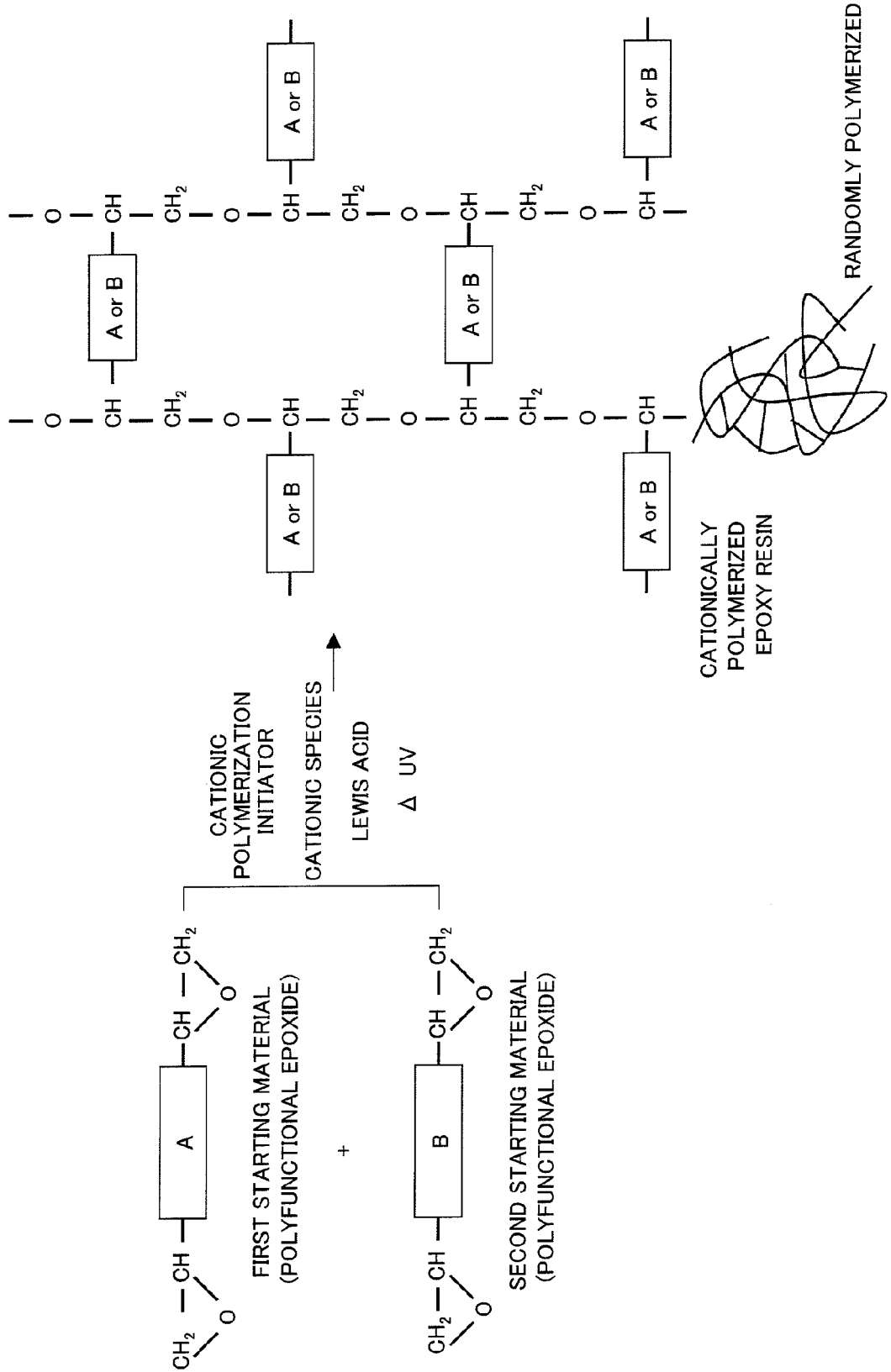
FIG. 11, showing one embodiment of the present invention, illustrates a reaction scheme to obtain a cross-linked epoxy resin.

FIG. 11 illustrates a reaction scheme to obtain a cross-linked epoxy resin. As illustrated in FIG. 11, polyfunctional epoxides each having epoxy groups bonded to both ends of a skeletal portion (indicated by "A" or "B" in FIG. 11) thereof are used as first and second starting materials. Such an epoxide may be a monomer, an oligomer, or a polymer. Moreover, the first and second starting materials are mixed and then copolymerized in the presence of cationic species generated from a polymerization initiator and Lewis acids, whereby a cationically polymerized epoxy resin is obtained through random copolymerization of the first and second starting materials. This epoxy resin is a cross-linked reticular structure. Therefore, in Step S2 described above, the first and second starting materials, the photoinitiator dissolved in the organic solvent, and the like may be injected into the depression 60 in the glass substrate 10.

It is preferable that each of the first and second starting materials not have a benzene ring (aromatic ring) structure in the skeletal portion thereof. That is, it is preferable that the transparent resin 65 not have a benzene ring structure. The reason for this is that if the transparent resin 65 has a benzene ring structure, there will be an increase in optical anisotropy and a decrease in transparency. Epoxy resins (hydrogenerated epoxy resins) each hydrogenerated with an epoxide having a benzene ring structure can be suitably used as the starting materials. Further, aliphatic epoxides, alicyclic epoxides, and the like can be used the starting materials.

Specific examples of the starting materials includes a hydrogenerated bisphenol A epoxy resin, 3,4-epoxycyclohexylmethyl-3,4-epoxycyclohexanecarboxylate, a 1,2-epoxy-4-(2-oxiranyl)cyclohexane addition product of 2,2-bis(hydroxymethyl)-1-butanol, and 3,4-epoxycyclohexylmethyl-3,4-epoxycyclohexanecarboxylate.

Although FIG. 11 illustrates a copolymer that is obtained by copolymerizing two types of starting materials, the present invention is not limited to this, and may be a polymer that is obtained by polymerizing one type of starting material or a copolymer that is obtained by copolymerizing three or more types of starting material. However, it is preferable to copolymerize plural types of starting material, because the optical anisotropy of the resulting epoxy resin can be better suppressed than when one type of starting material is polymerized. When plural types of starting material are mixed and copolymerized, it is preferable that the polymerization percentage of a single type of starting material be prevented from exceeding 90 wt % of all the starting materials. If one of the starting materials contained in the polymer comes to occupy a weight greater than 90 wt % of all the starting materials, there will be an increase in optical anisotropy, as with a polymer that is obtained by polymerizing one type of starting material. However, the optical anisotropy can be suppressed by preventing the polymerization percentage of a single type of starting material from exceeding 90 wt % of all the starting materials.

When the cross-linked epoxy resin is used as the transparent resin 65 for filling the depression 60, usable examples of the photoinitiator include a triphenyl sulfonium hexafluorophosphate salt, a mixture of a diphenyl iodonium hexafluorophosphate salt and thioxanthone, a triphenyl sulfonium hexafluoroantimonate salt, a diphenyl iodonium hexafluoroantimonate salt, and a combination thereof.

Figure 12:
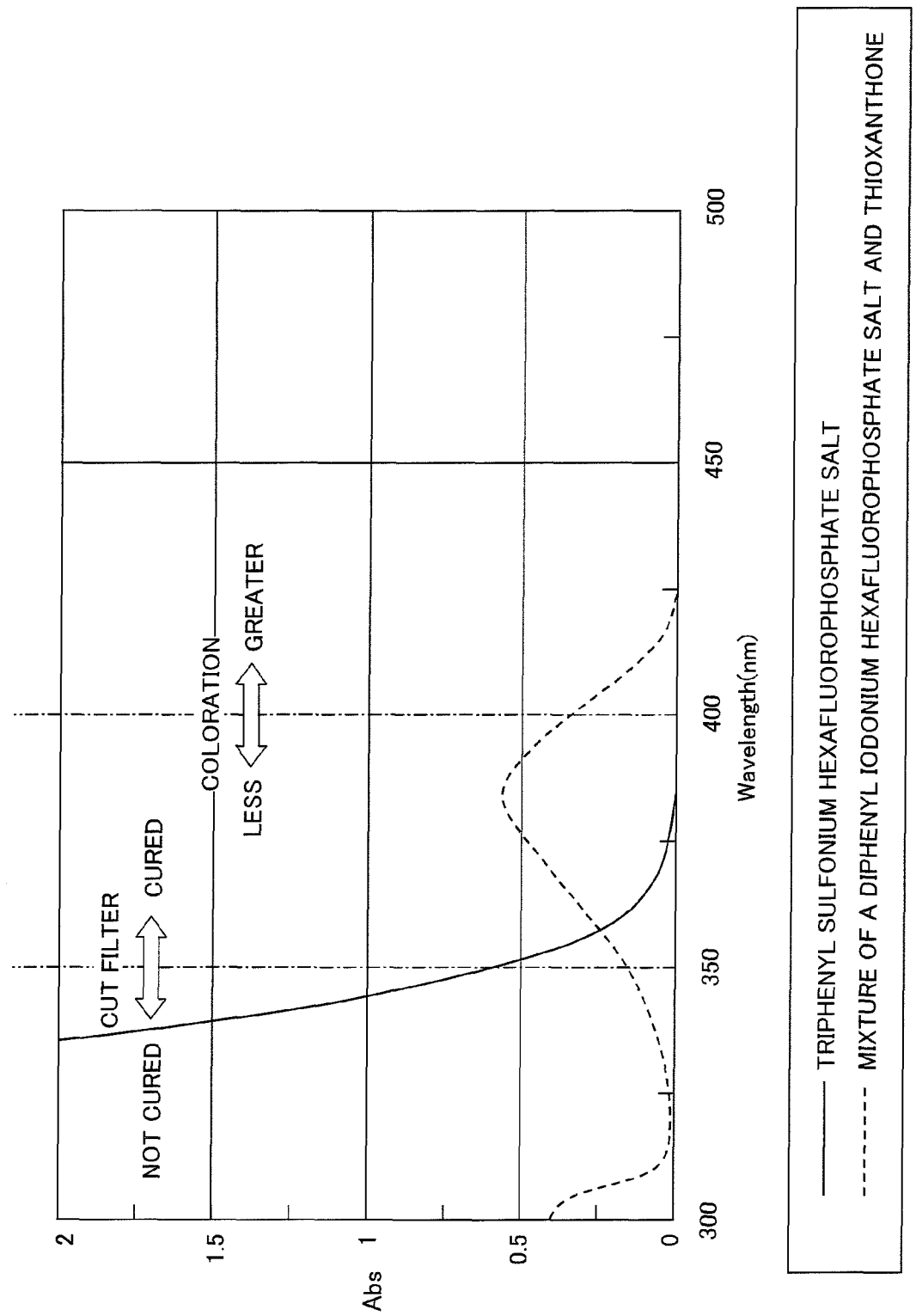
FIG. 12 illustrates absorption spectra of photoinitiators.

FIG. 12 illustrates absorption spectra of photoinitiators. In FIG. 12, the solid line indicates an absorption spectrum of a triphenyl sulfonium hexafluorophosphate salt, and the dotted line indicates an absorption spectrum of a mixture of a diphenyl iodonium hexafluorophosphate salt and thioxanthone. As mentioned above, in view of the effect on the liquid crystal material 20, it is preferable that the wavelength of light with which the materials for the transparent resin are irradiated for photopolymerization be not less than 350 nm. Therefore, it is preferable that the photoinitiator be able to absorb light at a wavelength of not less than 350 nm. As illustrated in FIG. 12, both of the photoinitiators satisfy the condition.

Furthermore, it is found from Examples below that in order to suppress coloration of the transparent resin 65, it is preferable that the photoinitiator not absorb light at a wavelength of not less than 400 nm. As illustrated in FIG. 12, the triphenyl sulfonium hexafluorophosphate salt satisfies the condition, whereas the mixture of a diphenyl iodonium hexafluorophosphate salt and thioxanthone does not satisfy the condition. From these points, it can be said that the triphenyl sulfonium hexafluorophosphate salt is suitable for use as the photoinitiator for the following reasons (1) and (2): (1) Since the triphenyl sulfonium hexafluorophosphate salt does not absorb light at a wavelength of not less than 400 nm, the coloration of the transparent resin after curing can be suppressed; and (2) Since the triphenyl sulfonium hexafluorophosphate salt can absorb light at a wavelength of not less than 350 nm, the polymerization can be accelerated without an adverse effect of light of a wavelength of not less than 350 nm on the liquid crystal material 20.

On the other hand, when the transparent resin is a cross-linked (meth)acrylic resin, it is preferable that the cross-linked (meth)acrylic resin be obtained through copolymerization of plural types of starting material or, more specifically, through random copolymerization of a third starting material composed of a (meth)acrylic ester monomer or oligomer and the like and a fourth starting material for use in cross-linking. A specific usable example of the cross-linked (meth)acrylic resin (transparent resin 65) is a cross-linked polymethylmethacrylate (PMMA) resin. This causes suppression in optical anisotropy of the (meth)acrylic resin, thus reducing the size of birefringence.

Figure 13:
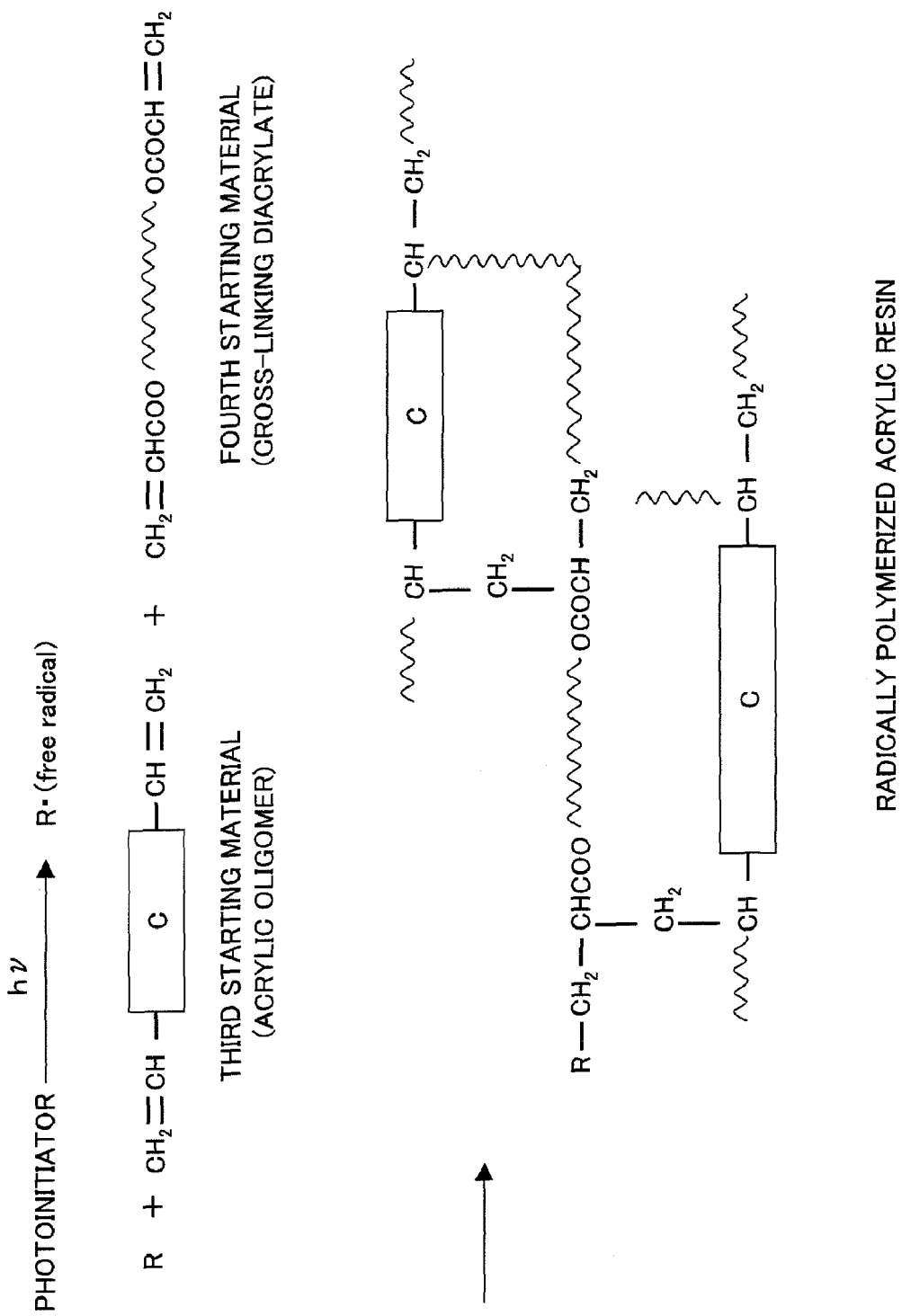
FIG. 13, showing one embodiment of the present invention, illustrates a reaction scheme to obtain a cross-linked acrylic resin.

FIG. 13 illustrates a reaction scheme to obtain a cross-linked acrylic resin. In this example, as illustrated in FIG. 13, an oligomer of acrylic ester is used as the third starting material, and a cross-linking diacrylate is used as the fourth starting material. Moreover, the third starting material and the fourth starting material are mixed and then radically polymerized in the presence of the photoinitiator, whereby a radically polymerized acrylic resin can be obtained through random copolymerization of the third starting material and the fourth starting material. The acrylic resin is a cross-linked reticular structure. Therefore, in Step S2 described above, the third starting material, the fourth starting material, and the photoinitiator dissolved in the organic solvent (or monomer starting material) may be injected into the depression 60 in the glass substrate 10. In this example, the acrylic resin is synthesized; however, it is needless to say that a methacrylic resin can be synthesized in the same manner. Further, although this example illustrates a polymer that is obtained by copolymerizing two types of starting material, the present invention is not limited to this, and may polymerize one type of starting material or copolymerize three or more types of starting material. However, it is preferable to copolymerize plural types of starting material, because the optical anisotropy of the resulting (meth)acrylic resin can be better suppressed than when one type of starting material is copolymerized.

Examples of (meth)acrylic ester constituting the third material include, but are not particularly limited to: alkyl ester(meth)acrylate such as methyl(meth)acrylate, ethyl (meth)acrylate, n-propyl(meth)acrylate, n-butyl(meth)acrylate, isobutyl(meth)acrylate, t-butyl(meth)acrylate, 2-ethylhexyl(meth)acrylate, and lauryl(meth)acrylate; cycloalkyl ester(meth)acrylate such as cyclohexyl(meth)acrylate; and basic ester(meth)acrylate such as dimethylaminoethyl(meth) acrylate and diethylaminoethyl(meth)acrylate. These (meth) acrylate esters may be used alone or as a appropriate mixture of two or more of them.

Meanwhile, as the fourth starting material, a cross-linking agent such as a cross-linking monomer is used. The fourth starting material only needs to be a compound having a plurality of functional groups that react with the functional groups contained in the aforementioned third starting material. Examples of the fourth starting material include, but are not particularly limited to: polyfunctional (meth)acrylate such as ethylene glycol di(meth)acrylate, diethylene glycol di(meth)acrylate, propylene glycol di(meth)acrylate, dipropylene glycol di(meth)acrylate, neopentyl glycol di(meth) acrylate, trimethylolpropane tri(meth)acrylate, pentaerythritol tetra(meth)acrylate; epoxy(meth)acrylates; divinyl benzene; diallyl phthalate; diallyl isophthalate; triallyl cyanurate; and triallyl isocyanurate.

As in the case of the aforementioned epoxy resin, it is preferable that neither the third starting material nor the fourth starting material have a benzene ring structure, and that the cross-linked (meth)acrylic resin not have a benzene ring structure.

Although the foregoing has been described by taking, as an example, a case where the cross-linked (meth)acrylic resin is formed by using a cross-linking agent as the fourth starting material, the present embodiment is not limited to this. That is, it is needless to say that a cross-linking agent is not needed when a self-cross-linking (meth)acrylic monomer or oligomer is used as the third starting material.

When the cross-linked (meth)acrylic resin is used as the transparent resin 65 for filling the depression 60, usable examples of the photoinitiator include benzophenone, 1-hydroxy-cyclohexyl-phenyl ketone, benzyl methyl ketal, acyl phosphine oxide, and a combination thereof.

It is possible to add various additives in addition to the aforementioned starting materials and the photoinitiator in synthesizing the transparent resin 65 composed of the epoxy or (meth)acrylic resin cross-linked by polymerizing the starting materials. Examples of such additives include a silane coupling agent and an antioxidant.

Incidentally, a comparison between the case where the cross-linked epoxy resin is used as the transparent resin 65 for filling the depression 60 and the case where the cross-linked (meth)acrylic resin is used as the transparent resin 65 for filling the depression 60 shows that the epoxy resin is cured by cationic polymerization and therefore is not inhibited by oxygen from reacting, whereas the (meth)acrylic resin is cured by radical polymerization and therefore is inhibited by oxygen from reacting. Further, as compared with the (meth) acrylic resin, the epoxy resin shrinks less when cured, is higher in heat resistance, and is superior in chemical resistance and solvent resistance. Therefore, it can be said that the epoxy resin is more suitable for use as the transparent resin 65 for filling the depression 60. In other words, it is more preferable that the starting materials for the transparent resin 65 be of a type selected from the group consisting of cationically polymerizable monomers or oligomers than of radically polymerizable monomers and oligomers.

As described above, the method of the present embodiment for repairing a glass substrate is configured such that a depression 60 in the surface of a glass substrate 10 is filled with a transparent resin composed of either a cross-linked epoxy resin or a cross-linked (meth)acrylic resin or, more specifically, that a depression 60 is filled with a transparent resin obtained as a result of a polymerization reaction produced in the depression 60 by filling the depression 60 with starting materials from which the transparent resin is made and a photoinitiator, irradiating the filling starting materials and photoinitiator with light, and treating them with heat. Thus, the use of the transparent resin as a material for filling the depression 60 makes it possible to repair the glass substrate 10 at a temperature lower than a sintering temperature.

[2. Examples]

The following explains some experiments conducted in order to test the effectiveness of the present invention. However, the present invention is not limited to the following experimental arrangements.

[2-1. Experiment 1]

In the present experiment, the birefringent properties of plural types of transparent resin were evaluated. In order to evaluate the birefringent properties of transparent resins, an index called "maximum birefringence" was introduced. When a transparent resin has a stereoscopic shape, birefringence varies three-dimensionally depending on an angle of incidence of light onto the transparent resin. Therefore, degrees of birefringence that is caused by the transparent resin also vary depending on the angle of incidence of light on the transparent resin. Accordingly, refractive indices of the transparent resin were measured respectively along three orthogonal axes (x axis, y axis, z axis) orthogonal to one another. From among three refractive indices thus obtained, a pair of refractive indices that have a greatest difference from each other were selected. A value of the difference between the pair of refractive indices thus selected was calculated as a size of maximum birefringence of the transparent resin. When the size of maximum birefringence is small, birefringence is unlikely to occur no matter from which direction light is incident on the transparent resin, and it can be said that the optical anisotropy (birefringence) of the transparent resin is stable and low.

In the present experiment, Samples 1 to 5 below were prepared as samples of transparent resin.

(Sample 1)

Sample 1 was prepared in the following manner. Seventy parts by weight of a hydrogenerated bisphenol A epoxy resin (first starting material) and thirty parts by weight of 3,4-epoxycyclohexylmethyl-3,4-epoxycyclohexanecarboxylate (second starting material) were homogenously mixed. To the mixture, four parts by weight of a propylene carbonate solution (organic solvent) in which 50 wt % of a triphenyl sulfonium hexafluorophosphate salt (photoinitiator) had been dissolved in advance and two parts by weight of 3-glycidoxypropyltrimethoxysilane (silane coupling agent) were added, and then stirred and dissolved. Then, the dissolved matter was irradiated with ultraviolet radiation by an ultraviolet curing apparatus (manufactured by EYE GRAPHICS Co., Ltd.) so that an amount of irradiation of 6,000 mJ/cm$^2$ was attained, and then heat-treated at 100° C. for thirty minutes. Thus obtained was a cured transparent resin (Sample 1).

(Sample 2)

Sample 2 was prepared in the following manner. Seventy parts by weight of a 1,2-epoxy-4-(2-oxiranyl)cyclohexane addition product of 2,2-bis(hydroxymethyl)-1-butanol (first starting material) and thirty parts by weight of 3,4-epoxycyclohexylmethyl-3,4-epoxycyclohexanecarboxylate (second starting material) were homogenously mixed. To the mixture, four parts by weight of a propylene carbonate solution (organic solvent) in which 50 wt % of a triphenyl sulfonium hexafluorophosphate salt (photoinitiator) had been dissolved in advance and two parts by weight of 3-glycidoxypropyltrimethoxysilane (silane coupling agent) were added, and then stirred and dissolved. Then, the dissolved matter was irradiated with ultraviolet and heat-treated under the same conditions as in the case of Sample 1. Thus obtained was a cured transparent resin (Sample 2).

(Samples 3 to 5)

Used as Sample 3 was a triacetyl cellulose (TAC) film (manufactured by FUJIFILM Corporation). Used as Sample 4 was a retardation film (manufactured by ZEON Corporation) composed of Zeonor®, which is a cycloolefin polymer. Used as Sample 5 was a polycarbonate resin plate (Teijin Kasei Co., Ltd.) having a thickness of 3 mm.

Then, refractive indices of Samples 1 to 5 above were measured at a temperature of 25±1° C. using a prism coupler apparatus (manufactured by METRICON Corporation). The refractive indices were measured along the x, y, and z axes orthogonal to one another using light of a wavelength of 633 nm. Furthermore, values of maximum birefringence were calculated according to the aforementioned method. The results are shown below in Table 1. In Table 1, the symbols "nx", "ny", and "nz" indicate refractive indices along the x, y, and z axes, respectively.

TABLE 1

|  |  | Sample 1 | Sample 2 | Sample 3 | Sample 4 | Sample 5 |
|---|---|---|---|---|---|---|
| Indices | nx | 1.5190 | 1.5180 | 1.4868 | 1.5343 | 1.5823 |
| of | ny | 1.5190 | 1.5180 | 1.4868 | 1.5334 | 1.5818 |
| Refraction | nz | 1.5190 | 1.5180 | 1.4860 | 1.5329 | 1.5824 |
| Maximum Birefringence | | 0 | 0 | nx − nz = 0.0008 | nx − nz = 0.0014 | nz − ny = 0.0006 |

As shown in Table 1, Samples 3 to 5 all had a size of maximum birefringence of more than 0.0005. On the other hand, Samples 1 and 2 both had a size of maximum birefringence of 0 (less than 0.0001), had optical anisotropy sufficiently suppressed, and therefore were shown to be transparent resins suitable especially to repairing a glass substrate of a liquid crystal display panel.

From these results, it can be said that from a point of view of the birefringent properties, the cross-linked epoxy resin (Sample 1), which is a random polymer of a hydrogenerated bisphenol A epoxy resin and 3,4-epoxycyclohexylmethyl-3,4-epoxycyclohexanecarboxylate, and the cross-linked epoxy resin (Sample 2), which is a random polymer of a 1,2-epoxy-4-(2-oxiranyl)cyclohexane addition product of 2,2-bis(hydroxymethyl)-1-butanol and 3,4-epoxycyclohexylmethyl-3,4-epoxycyclohexanecarboxylate, are especially suitable for use as the transparent resin 65 for filling the depression 60.

[2-2. Experiment 2]

In the present experiment, the coloration properties of transparent resins and the generation of bubbles at the time of curing were evaluated. In the present experiment, Samples 6 to 10 were prepared as samples of transparent resin. In the present experiment, each sample was formed in a depression provided in a surface of a glass substrate.

(Sample 6)

Sample 6 was prepared in the following manner. As in the case of Sample 1, seventy parts by weight of a hydrogenerated bisphenol A epoxy resin (first starting material) and thirty parts by weight of 3,4-epoxycyclohexylmethyl-3,4-epoxycyclohexanecarboxylate (second starting material) were homogenously mixed. To the mixture, four parts by weight of a propylene carbonate solution (organic solvent) in which 50 wt % of a triphenyl sulfonium hexafluorophosphate salt (photoinitiator) had been dissolved in advance and two parts by weight of 3-glycidoxypropyltrimethoxysilane (silane coupling agent) were added, and then stirred and dissolved. Then, the dissolved matter was covered with a Zeonor® film, irradiated with ultraviolet radiation at an output of 200 mW for five minutes using an LC6 (manufactured by Hamamatsu Photonics K.K.), and then heat-treated at 100° C. of thirty minutes. It should be noted that the dissolved matter was irradiated with ultraviolet radiation through a cut filter that cuts light at a wavelength of less than 350 nm. Thus obtained was a cured transparent resin (Sample 6).

(Sample 7)

Sample 7 was prepared in the following manner. As in the case of Sample 2, seventy parts by weight of a 1,2-epoxy-4-(2-oxiranyl)cyclohexane addition product of 2,2-bis(hydroxymethyl)-1-butanol (first starting material) and thirty parts by weight of 3,4-epoxycyclohexylmethyl-3,4-epoxycyclohexanecarboxylate (second starting material) were homogenously mixed. To the mixture, four parts by weight of a propylene carbonate solution (organic solvent) in which 50 wt % of a triphenyl sulfonium hexafluorophosphate salt (photoinitiator) had been dissolved in advance and two parts by weight of 3-glycidoxypropyltrimethoxysilane (silane coupling agent) were added, and then stirred and dissolved. Then, the dissolved matter was covered with a Zeonor® film, and then irradiated with ultraviolet and heat-treated under the same conditions as in the case of Sample 6. Thus obtained was a cured transparent resin (Sample 7).

(Sample 8)

Sample 8 was prepared in the following manner. Although Sample 8 is basically the same as Sample 6, Sample 8 differs only in photopolymerization condition from Sample 6. That is, seventy parts by weight of a hydrogenerated bisphenol A epoxy resin (first starting material) and thirty parts by weight of 3,4-epoxycyclohexylmethyl-3,4-epoxycyclohexanecarboxylate (second starting material) were homogenously mixed. To the mixture, four parts by weight of a propylene carbonate solution (organic solvent) in which 50 wt % of a triphenyl sulfonium hexafluorophosphate salt (photoinitiator) had been dissolved in advance and two parts by weight of 3-glycidoxypropyltrimethoxysilane (silane coupling agent) were added, and then stirred and dissolved. Then, the dissolved matter was covered with a Zeonor® film, irradiated with ultraviolet radiation at an output of 1 mW for ten minutes using a chemical lamp, and then heat-treated under the same conditions as in the aforementioned case of Sample 6. Thus obtained was a cured transparent resin (Sample 8).

(Sample 9)

Sample 9 was prepared in the following manner. Although Sample 9 is basically the same as Sample 8, Sample 9 differs only in type of photoinitiator from Sample 8. That is, seventy parts by weight of a hydrogenerated bisphenol A epoxy resin (first starting material) and thirty parts by weight of 3,4-epoxycyclohexylmethyl-3,4-epoxycyclohexanecarboxylate (second starting material) were homogenously mixed. To the mixture, four parts by weight of a propylene carbonate solution (organic solvent) in which 50 wt % of a mixture of a diphenyl iodonium hexafluorophosphate salt and thioxanthone (photoinitiator) had been dissolved in advance and two parts by weight of 3-glycidoxypropyltrimethoxysilane (silane coupling agent) were added, and then stirred and dissolved. Then, the dissolved matter was covered with a Zeonor® film, and then irradiated with ultraviolet and heat-treated under the same conditions as in the case of Sample 8. Thus obtained was a cured transparent resin (Sample 9).

(Sample 10)

Sample 10 was prepared in the following manner. Although Sample 10 is basically the same as Sample 6, Sample 10 differs from Sample 6 in that the resin is cured solely by heat treatment without photopolymerization. That is, seventy parts by weight of a hydrogenated bisphenol A epoxy resin (first starting material) and thirty parts by weight of 3,4-epoxycyclohexylmethyl-3,4-epoxycyclohexanecarboxylate (second starting material) were homogenously mixed. To the mixture, four parts by weight of a propylene carbonate solution (organic solvent) in which 66 wt % of a 3-methyl-2-butynyl tetramethylsulfonium hexafluoroantimonate salt (thermal initiator) had been dissolved in advance instead of a photoinitiator and two parts by weight of 3-glycidoxypropyltrimethoxysilane (silane coupling agent) were added, and then stirred and dissolved. Then, the dissolved matter was covered with a Zeonor® film, and then heat-treated at 100° C. of thirty minutes. Thus obtained was a cured transparent resin (Sample 10).

The coloration and bubble generation of Samples 6 to 10 were evaluated. The results are shown below in Table 2. In Table 2, the item "Photoinitiator 1" indicates a triphenyl sulfonium hexafluorophosphate salt, and the item "Photoinitiator 2" indicates a mixture of a diphenyl iodonium hexafluorophosphate salt and thioxanthone.

Further, Sample 9, for which a mixture of a diphenyl iodonium hexafluorophosphate salt and thioxanthone had been used as a photoinitiator, was found to be colored. On the other hand, Samples 6 to 8, for which a triphenyl sulfonium hexafluorophosphate salt had been used as a photoinitiator, were found to be colored little. Therefore, it can be said that the coloration of an epoxy resin is prevented by using a triphenyl sulfonium hexafluorophosphate salt, which does not absorb light at a wavelength of not less than 400 nm, as a photoinitiator.

As described above, the method for repairing a glass substrate is a method for repairing a glass substrate that is used in a display panel of a flat panel display and that has a depression in a surface thereof, the method including a hole plugging step of causing the depression in the surface of the glass substrate to be filled with a thermosetting or photocurable transparent resin or, preferably, a transparent resin that is at least either a cross-linked epoxy resin or a cross-linked (meth) acrylic resin.

Since the method for repairing a glass substrate is configured such that the depression in the surface of the glass substrate is filled with the transparent resin, the glass substrate can be repaired at a low temperature without carrying out a sintering process.

TABLE 2

|  | Sample 6 | Sample 7 | Sample 8 | Sample 9 | Sample 10 |
|---|---|---|---|---|---|
| Type of Resin | Similar to Sample 1 | Similar to Sample 2 | Similar to Sample 1 | Similar to Sample 1 | Similar to Sample 1 |
| Photo-initiator | Photoinitiator 1 | Photoinitiator 1 | Photoinitiator 1 | Photoinitiator 2 | NA |
| Curing Conditions | UV200 mW × 5 min. + 100° C. × 30 min. | UV200 mW × 5 min. + 100° C. × 30 min. | Chemical Lamp 1 mW × 10 min. + UV200 mW × 5 min. + 100° C. × 30 min. | Chemical Lamp 1 mW × 10 min. + UV200 mW × 5 min. + 100° C. × 30 min. | 100° C. × 30 min. |
| Coloration Properties | Only slightly | Only slightly | Only slightly | Exhibited | None |
| Bubbles | None | None | None | None | Generated |

As shown in Table 2, Sample 10, which had been cured solely by heat treatment, has bubbles generated therein. On the other hand, Samples 6 to 9, cured with concomitant use of photopolymerization, had no bubbles generated therein. Therefore, it can be said that the generation of bubbles in a resin is suitably suppressed by concomitantly using photopolymerization for curing the resin.

It should be noted that the use of photopolymerization (photocuring) brings about the advantage of being able to cure (polymerize) a resin at a low temperature. In the experiment above, all the samples were heat-treated at 100° C. for thirty minutes for uniform experimental conditions. However, in the case of use of photocuring, the same sample (the same resin and the same photoinitiator) can be heat-treated at a lower temperature and, in some cases, the heat treatment can be omitted. On the other hand, in the case of curing solely by heat treatment, the heat treatment necessarily needs to be carried out at a certain temperature or higher.

In the case of photocuring, a change in volume at the time of curing is caused solely by curing shrinkage due to a polymerization reaction. However, in the case of heat curing, a change in volume at the time of curing is affected by thermal expansion of liquid starting materials to be cured, as well as curing shrinkage due to a polymerization reaction. For these reasons, a change in volume of a resin can be better suppressed by photocuring than heat curing so that it becomes easier to reduce the generation of bubbles.

The method for repairing a glass substrate may be a method for repairing a glass substrate having a bubble buried therein, the method further including a removing step of forming the depression by removing a glass material for the glass substrate so that the depression extends from the surface of the glass substrate to the bubble. The foregoing configuration makes it possible to suitably repair a glass substrate having a bubble buried therein.

Alternatively, the aforementioned method for repairing a glass substrate may be a method for repairing a glass substrate containing a foreign body, the method further including a removing step of forming the depression by removing the foreign body contained in the glass substrate. The foregoing configuration makes it possible to suitably repair a glass substrate containing a foreign body.

Alternatively, the aforementioned method for repairing a glass substrate may be such that the depression is a blemish formed in the surface of the glass substrate or a bubble having an opening in the surface of the glass substrate. The foregoing configuration makes it possible to suitably repair a glass substrate having a blemish or a bubble.

Further, it is preferable that: the glass substrate be used in a liquid crystal display panel; and assuming that the transparent resin has a size of maximum birefringence equal to a value of a difference between two refractive indices which, among refractive indices of the transparent resin with respect to three orthogonal axes, have a greatest difference from each other, the transparent resin have a size of maximum birefringence of not more than 0.0005.

According to the foregoing configuration, the transparent resin has a small size of maximum birefringence of not more than 0.0005, thus making it possible to sufficiently suppress the emergence of an unintended luminescent spot or the like in a repaired site.

Further, it is preferable that the transparent resin has a size of maximum birefringence of not more than 0.0003.

According to the foregoing configuration, the transparent resin has a smaller size of maximum birefringence of not more than 0.0003, thus making it possible to sufficiently suppress the emergence of an unintended luminescent spot or the like in a repaired site.

Further, it is preferable that: the glass substrate be used in a liquid crystal display panel; and the transparent resin, e.g., the cross-linked epoxy resin and the cross-linked (meth) acrylic resin, be a copolymer (i.e., a product of copolymerization of plural types of starting material).

According to the foregoing configuration, the transparent resin for filling a depression, e.g., the cross-linked epoxy resin and the cross-linked (meth)acrylic resin, is a product of copolymerization of plural types of starting material (such as monomers and prepolymers) and, as such, has optical anisotropy suppressed as compared with a product of polymerization of a single type of starting material, thus making it possible to further suppress the emergence of an unintended luminescent spot or the like in a repaired site.

Further, it is preferable that the transparent resin, e.g., the cross-linked epoxy resin and the cross-linked (meth)acrylic resin, not have a benzene ring structure.

According to the foregoing configuration, the transparent resin does not have a benzene ring structure and, as such, has birefringent properties suppressed, making it possible to suppress the emergence of an unintended luminescent spot or the like in a repaired site. In addition, since the transparent resin does not have a benzene ring structure, the transparent resin improves in transparency, thus making it possible to obtain a high-quality glass substrate.

Further, it is preferable that the hole plugging step include filling the depression with starting materials for the transparent resin and a photoinitiator and then irradiating the starting materials and the photoinitiator with light.

According to the foregoing configuration, the starting materials are polymerized by photopolymerization, which makes it possible to reduce the temperature of heat treatment required for the polymerization and, in some cases, makes it possible to omit the heat treatment. This suppresses a change in volume of the starting materials due to thermal expansion and, as will be shown later in Examples, makes it possible to reduce the generation of bubbles in the transparent resin. This makes it possible to obtain a high-quality glass substrate having no bubbles contained in a repaired site.

Further, it is preferable that the photoinitiator absorb light at a wavelength of not less than 350 nm and not absorb light at a wavelength of not less than 400 nm.

In general, a material that absorbs light at a long wavelength (especially in the visible region) has a color or exhibits high coloration properties. However, according to the foregoing configuration, since the photoinitiator does not absorb light at a wavelength of not less than 400 nm, the transparent resin improves in transparency after curing, thus making it possible to obtain a high-quality glass substrate.

Further, when a glass substrate constituting a liquid crystal display panel having a liquid crystal material sealed in is irradiated with light at a wavelength of less than 350 nm, the liquid crystal material is adversely affected. However, since the photoinitiator can absorb light at a wavelength of not less than 350 nm, the polymerization can be initiated and accelerated without an adverse effect of light of a wavelength of not less than 350 nm on the liquid crystal material.

Further, it is preferable that: the glass substrate constitute a liquid crystal display panel; and the hole plugging step include causing the depression in the glass substrate constituting the liquid crystal display panel to be filled with the transparent resin.

A glass substrate constituting a liquid crystal display panel cannot be treated at a high temperature as in a sintering process, in view of adverse effects on a liquid crystal material sealed in between glass substrates and surrounding members, such as a color filter and a transparent electrode, formed on each glass substrate. However, since the foregoing configuration uses the transparent resin as a material for filling the depression, it does not require high-temperature treatment as in a sintering process. This makes it possible to directly repair a glass substrate constituting a liquid crystal display panel, and to reduce the amount of work, such as disassembly of the liquid crystal panel, which is necessary for repairing the glass substrate.

The present invention is not limited to the description of the embodiments above, but may be altered by a skilled person within the scope of the claims. An embodiment based on a proper combination of technical means disclosed in different embodiments is encompassed in the technical scope of the present invention. Further, numerical values out of those ranges disclosed in the present specification are encompassed in the present invention, provided such numerical values fall within a reasonable range that does not defeat the purpose of the present invention.

INDUSTRIAL APPLICABILITY

The present invention makes it possible suitably repair a defective glass substrate; therefore, the present invention can be applied to glass substrates in various display panels such as liquid crystal panels.

The invention claimed is:

1. A method for repairing a glass substrate that is used in a liquid crystal display panel of a flat panel display and that has a depression in a surface thereof, the method comprising
a hole plugging step of causing the depression in the surface of the glass substrate to be filled with a transparent resin that is at least either a cross-linked epoxy resin or a cross-linked (meth)acrylic resin, the transparent resin having a size of maximum birefringence of not more than 0.0005 wherein the size of maximum birefringence is defined by a greatest difference between two refractive indices among refractive indices of the transparent resin obtained with respect to three orthogonal axes,
the hole plugging step including
filling the depression with a photoinitiator and with plural types of starting materials for the transparent resin, wherein a single type of the starting materials has a polymerization percentage not exceeding 90 weight-% of all the starting materials, and then
irradiating the starting materials and the photoinitiator with light to cause random copolymerization.

2. The method as set forth in claim 1, wherein the transparent resin has a size of maximum birefringence of not more than 0.0003.

3. The method as set forth in claim 1, wherein the transparent resin does not have a benzene ring structure.

4. The method as set forth in claim 1, wherein the photoinitiator absorbs light at a wavelength of not less than 350 nm and does not absorb light at a wavelength of not less than 400 nm.

5. A process for producing a glass substrate that is used in a display panel of a flat panel display, the process comprising each step of a method as set forth in claim 1.

6. A method for repairing a glass substrate that is used in a liquid crystal display panel of a flat panel display and that has a depression on a surface thereof, the method comprising a hole plugging step of causing the depression in the surface of the glass substrate to be filled with a cross-linked, thermosetting or photocurable transparent resin, the transparent resin having a size of maximum birefringence of not more than 0.0005 wherein the size of maximum birefringence is defined by a greatest difference between two refractive indices among refractive indices of the transparent resin obtained with respect to three orthogonal axes, the hole plugging step including
filling the depression with a photoinitiator and with plural types of starting materials for the transparent resin, wherein a single type of the starting materials has a polymerization percentage not exceeding 90 weight-% of all the starting materials, and then
irradiating the starting materials and the photoinitiator with light to cause random copolymerization.

7. The method as set forth in claim 6, wherein the transparent resin has a size of maximum birefringence of not more than 0.0003.

8. The method as set forth in claim 6, wherein the transparent resin does not have a benzene ring structure.

9. The method as set forth in claim 6, wherein the photoinitiator absorbs light at a wavelength of not less than 350 nm and does not absorb light at a wavelength of not less than 400 nm.

10. A process for producing a glass substrate that is used in a display panel of a flat panel display, the process comprising each step of a method as set forth in claim 6.

11. A glass substrate that is used in a liquid crystal display panel of a flat panel display, the glass substrate having a depression in a display region on a surface that serves as a display surface when the glass substrate constitutes the display panel, the depression being caused to be filled, with a transparent resin that is at least either a cross-linked epoxy resin or a cross-linked (meth)acrylic resin, the transparent resin having a size of maximum birefringence of not more than 0.0005 wherein the size of maximum birefringence is defined by a greatest difference between two refractive indices among refractive indices of the transparent resin obtained with respect to three orthogonal axes, by filling the depression with a photoinitiator and with plural types of starting materials for the transparent resin, wherein a single type of the starting materials has a polymerization percentage not exceeding 90 weight-% of all the starting materials, and then irradiating the starting materials and the photoinitiator with light to cause random copolymerization.

12. A flat panel display comprising a glass substrate as set forth in claim 11.

13. A glass substrate that is used in a liquid crystal display panel of a flat panel display, the glass substrate having a depression in a display region on a surface that serves as a display surface when the glass substrate constitutes the display panel, the depression being caused to be filled, with a cross-linked, thermosetting or photocurable transparent resin, the transparent resin having a size of maximum birefringence of not more than 0.0005 wherein the size of maximum birefringence is defined by a greatest difference between two refractive indices among refractive indices of the transparent resin obtained with respect to three orthogonal axes, by filling the depression with a photoinitiator and with plural types of starting materials for the transparent resin, wherein a single type of the starting materials has a polymerization percentage not exceeding 90 weight-% of all the starting materials, and then irradiating the starting materials and the photoinitiator with light to cause random copolymerization.

14. A flat panel display comprising a glass substrate as set forth in claim 13.

* * * * *